A. ARTOM.
RECEIVING INSTRUMENT FOR WIRELESS SIGNALING.
APPLICATION FILED NOV. 2, 1917.

1,303,625.

Patented May 13, 1919.
2 SHEETS—SHEET 1.

INVENTOR
Alessandro Artom
BY
ATTORNEYS

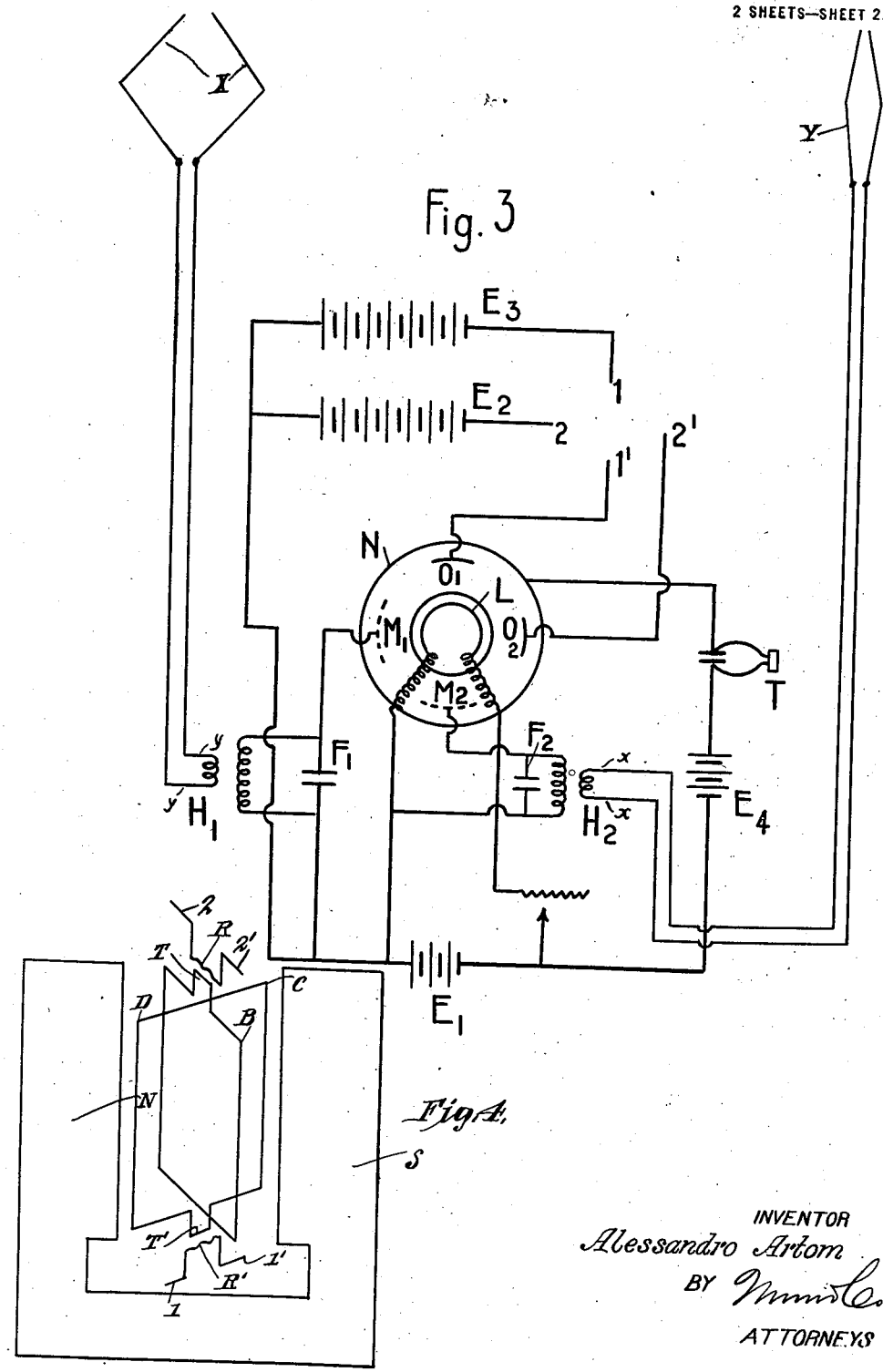

UNITED STATES PATENT OFFICE.

ALESSANDRO ARTOM, OF TURIN, ITALY.

RECEIVING INSTRUMENT FOR WIRELESS SIGNALING.

1,303,625.  Specification of Letters Patent. Patented May 13, 1919.

Application filed November 2, 1917. Serial No. 199,911.

*To all whom it may concern:*

Be it known that I, ALESSANDRO ARTOM, electrical engineer, of Turin, Italy, have invented certain new and useful Improvements in Receiving Instruments for Wireless Signaling, of which the following is a full, clear, and exact specification.

In my prior British specification N. 23,488 of 1903, I have described receiving appliances for wireless signaling based on electro-magnetic actions and substantially formed by coils of conducting wires suspended and oscillating under the action of currents traversing fixed coils.

The present invention consists in receiving appliances or devices for wireless signaling or the like, wherein the movable coils are traversed not by oscillatory but by rectified currents from the directive aerial conductors of a station designed for receiving signals from several directions, such, for instance, as that described in my prior British specification N. 19,805$^A$ of 1906.

The magnetic action on the movable coils described in my prior patent is produced, according to the present invention, by a powerful permanent magnet or electro-magnet.

The device may be in the form of a d'Arsonval galvanometer.

The coils are disposed vertically and are free to turn around a vertical axis; their angular disposition is similar to that of the vertical planes containing the directive aerials.

The coils are disposed as shown in Figure 1, or one beneath the other; they are, however, necessarily rigidly connected and pivoted, or suspended in any other suitable manner.

The oscillatory currents from the aerials conductors, before traversing the coils, will traverse the syntonized circuits comprising the detector which may be either of the crystal or of the electrolytic or ionized gas type, or of the magnetic, thermal, or thermo-electric type, so that they are transformed from oscillatory to rectified currents or to currents having a prevailing direction.

The coils may be arranged in circuits provided with thermo-couples influenced by thermal detectors in the oscillatory circuits, in which case the thermo-couples act as in Boys's micro-radiometer.

The connections between the directive aerials and the coils can be made by means of conducting spiral springs which should be very thin and very elastic, or mercury contacts can be used. These connections are not necessary if the Boys type of microgalvanometer with thermo-couples is used.

The coils may be of thin wire like galvanometer coils or may be made with a thicker wire, like ammeter coils.

When the rectified currents traverse the coils which are rigidly connected to each other, magnetic forces are produced by the action of the magnetic field, which cause the movable system formed by the several angularly disposed coils to be deflected, and such deflection could be shown by an index or a scale mirror.

It is known that the tangent of the angle of deflection depends upon the ratio of the values of the currents traversing the coils, these values being proportional to the currents in the aerial conductors of the receiving station, the deflection of the devices according to the present invention depending upon the direction from which the radiating waves arrive.

A graduation made once for all shows exactly the direction from which the electric waves arrive, provided the quadrant from which they are transmitted is known.

The rectified currents, after having traversed the instrument, are collected in a receiving circuit comprising a telephone or other suitable device. The total current may traverse an instrument similar to that described but containing only one coil. The deflections of the instrument will then be proportional to the total intensity of the received current.

Fig. 1 and Fig. 2 of the accompanying drawing show diagrammatically the disposition of the galvanometer coils.

Fig. 3 is a diagrammatic view of the circuit connections of a modified form of the device.

Fig. 4 is a diagrammatic view illustrating the use of thermo-couples.

NS is the magnet or electro-magnet.

AB and CD are the coils which are rigidly connected to each other and which are revoluble on the central axis O.

An index Z is attached to the coils.

A stationary soft iron cylinder I is disposed in the fields so as to reinforce the action of the magnetic field of the rotating coils.

The detectors or rectifiers of the electric waves are shown by K and K'.

The terminals 1, 1', and 2, 2' connect the instrument with the directive aerials X and Y.

The constructive forms which the invention may assume in practice are numerous and they vary according to the type of the detector or rectifier of electric waves which is used.

Though claiming the protection of my invention for use with detectors or rectifiers of any known type, I describe, by way of example, my apparatus in the following three preferred forms:

(1) In the movable coils AB and CD two thermo-couples are soldered and near the said couples two resistances of manganin or of any other suitable material are disposed and traversed by the oscillatory currents coming from the directive aerials. On account of the heat radiations the thermo-couples produce in the coils AB and CD rectified currents thus exciting electro-magnetic forces which cause the coils to take up a definite position in the stationary magnetic fields.

(2) When tubular detectors or rectifiers of the ionized gas type are used one of said tubes may be provided for each directive aerial.

In order to indicate with the greatest accuracy the direction from which the electric waves arrive, the particular form of tube for ionized gas shown in Fig. 3, which is a horizontal section of the tube, can be used with good results. The figure shows also diagrammatically the circuit connections.

The incandescent filament L is placed in the central part of a glass tube having a spherical or cylindrical form, provided at the periphery with the cylindrical plate N for the reception of the telephonic signals.

Figure 1:
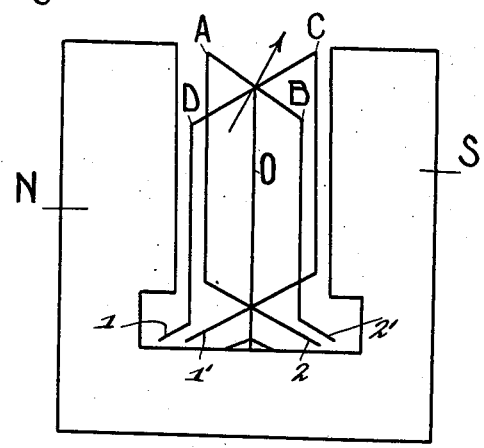
Figure 2:
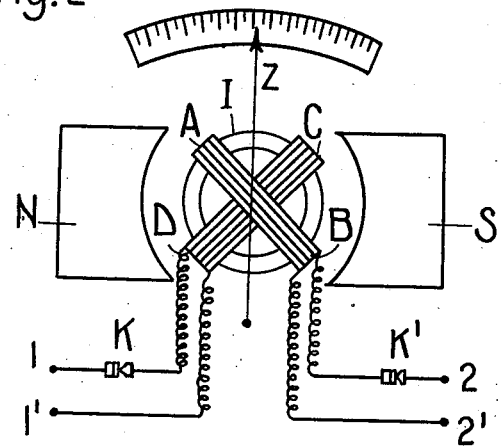

$M^1$ $M^2$ are metallic grids; $O^1$ $O^2$ are metallic plates connected respectively to the leads 1' and 2'. The latter are connected to the galvanometer coils as shown in Fig. 2.

The position of the grids $M^1$ $M^2$ relatively to the plates $O^1$ $O^2$ and to the filament is not necessarily that shown in the drawing but may be changed to other positions without departing from the spirit of the invention.

The battery $E^1$ is a source of energy for the filament L, the batteries $E^2$ and $E^3$ transmit current respectively across the ionized space between the incandescent filament and the conducting plates $O^1$, $O^2$. $E^4$ transmits current across the ionized space between the filament and the cylindrical plate N to energize the circuit of the telephone T. $F^1$ $F^2$ are capacities inserted in the oscillatory receiving circuit of which $H^1$ and $H^2$ represent the oscillation transformers, that is to say, the primary coils of the transformers H' and $H^2$ are connected at $xx$—$yy$ to the directive aerials.

(3) When a detector of the electrolytic type is used a single vessel containing acidulated water or other suitable liquid may be employed wherein the electrodes for both or all the detectors are immersed.

In Fig. 4 I have shown diagrammatically the arrangement of the thermo-couples. In this figure NS is the magnet, AB and CD are the galvanometer coils, T and T' are the thermo-couples and R and R' are thin strips of gold leaf or manganin which are connected with the directive aerials (not shown).

I claim:

1. A receiving apparatus for wireless signaling, for the purpose of showing the direction from which the wireless signals arrive, comprising means for producing a stationary magnetic field, directive aerials and movable coils in which thermo-couples are placed, said thermo-couples being under the thermo action of the current arriving from the directive aerials.

2. A receiving apparatus for wireless signaling, comprising means for producing a magnetic field, movable coils disposed in said magnetic field, directive aerials, means for transmitting rectified currents from the directive aerials through said coils, and thermo-couples associated with said movable coils, said thermo-couples being under the thermal action of the currents from the directive aerials.

3. A receiving apparatus for wireless signaling, comprising means for producing a magnetic field, a pair of coils disposed within the field, the planes of the coils being at right angles to each other, and said coils being rigidly connected at right angles with each other and electrically insulated, a pivotal support for said coils, directive aerials and means for transmitting rectified currents from the directive aerials through said coils.

4. A receiving apparatus for wireless signaling comprising means for producing a stationary magnetic field, a pair of coils disposed within the field, the planes of the coil being at right angles to each other, and said coils having relatively fixed positions, a thermo-couple element carried by one coil at one end thereof, a thermo-couple element carried by the other coil at the opposite end, conducting means adjacent to each of said thermo-couple elements, and directive aerials connected with said conducting means.

In witness whereof, I have hereunto signed my name in the presence of two subscribing witnesses.

ALESSANDRO ARTOM.

Witnesses:
 Tuz Andrea Luina,
 Guiseppe Asten.